United States Patent
Peng et al.

(10) Patent No.: US 11,753,299 B2
(45) Date of Patent: *Sep. 12, 2023

(54) PROCESS FOR H2 AND SYNGAS PRODUCTION

(71) Applicant: Air Products and Chemicals, Inc., Allentown, PA (US)

(72) Inventors: Xiang-Dong Peng, Lake Mary, FL (US); Henry Choisun Chan, Bellaire, TX (US); Kelly Danielle Aguilar, League City, TX (US); Shihong Yan, Sugarland, TX (US); Qiong Zhou, Katy, TX (US); Shylaja Gowda, Spring, TX (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/407,434

(22) Filed: Aug. 20, 2021

(65) Prior Publication Data

US 2023/0053522 A1  Feb. 23, 2023

(51) Int. Cl.
| | |
|---|---|
| C01B 3/48 | (2006.01) |
| B01D 46/00 | (2022.01) |
| B01J 12/00 | (2006.01) |
| B01J 19/00 | (2006.01) |
| C01B 3/52 | (2006.01) |

(52) U.S. Cl.
CPC ............... *C01B 3/48* (2013.01); *B01D 46/00* (2013.01); *B01J 12/005* (2013.01); *B01J 19/0013* (2013.01); *C01B 3/52* (2013.01); B01J 2219/00087 (2013.01); C01B 2203/0233 (2013.01); C01B 2203/0238 (2013.01); C01B 2203/0283 (2013.01); C01B 2203/0415 (2013.01); C01B 2203/0465 (2013.01); C01B 2203/0833 (2013.01); C01B 2203/0883 (2013.01); C01B 2203/0894 (2013.01); C01B 2203/1241 (2013.01)

(58) Field of Classification Search
CPC .... C01B 2203/1241; C01B 2203/0894; C01B 2203/0883; C01B 2203/0833; C01B 2203/0465; C01B 2203/0415; C01B 2203/0283; C01B 2203/0238; C01B 2203/0233

See application file for complete search history.

(56) References Cited

U.S. PATENT DOCUMENTS

| | | | |
|---|---|---|---|
| 3,728,093 A | 4/1973 | Cofield | |
| 2003/0046867 A1 | 3/2003 | Woods et al. | |
| 2013/0055637 A1* | 3/2013 | Ariyapadi | C10J 3/482 |
| | | | 48/119 |

FOREIGN PATENT DOCUMENTS

| | | |
|---|---|---|
| CN | 109399563 | 3/2019 |
| WO | 2010109184 | 9/2010 |

\* cited by examiner

*Primary Examiner* — Jafar F Parsa
(74) *Attorney, Agent, or Firm* — Jason M. Ploeger

(57) ABSTRACT

A process for producing syngas that uses the syngas product from a partial oxidation reactor to provide all necessary heating duties, which eliminates the need for a fired heater. Soot is removed from the syngas using a dry filter to avoid a wet scrubber quenching the syngas stream and wasting the high-quality heat. Without the flue gas stream leaving a fired heater, all of the carbon dioxide produced by the reforming process is concentrated in the high-pressure syngas stream, allowing essentially complete carbon dioxide capture.

3 Claims, 4 Drawing Sheets

PROCESS FOR H2 AND SYNGAS PRODUCTION

BACKGROUND

Industrial processes such as reforming hydrocarbon feeds to produce hydrogen and syngas will need to capture carbon dioxide (CO2) to mitigate the effects of climate change. Steam methane reforming (SMR) is the most common reforming technology, but uses air-fired combustion to generate the heat needed to drive the reforming reactions. Air-fired combustion, whether in an SMR or in a fired heater, generates a flue gas in which the CO2 is at low pressure and concentration due to the high amounts of inert nitrogen contributed by the air. Carbon capture from flue gas is costly, inefficient, and bulky. Eliminating air-fired combustion not only makes efficient capture of 100% of the CO2 in the process possible, but it also reduces capital costs by eliminating the need to handle the nitrogen in the air.

Oxygen-fired reforming methods can achieve relatively high carbon capture compared to conventional steam/hydrocarbon reforming methods since a majority of the CO2 produced in the oxygen-fired reforming methods can be recovered from the high pressure syngas stream using conventional acid gas removal operations. Oxygen-fired reforming, like partial oxidation (POX), produces H2 and/or CO and a lot of excess heat. This heat can be used for process heating and steam generation, and the latter may be exported as a steam product if there is local demand. Optimizing the heat integration for oxygen-fired reforming is therefore a key design consideration.

There is a need for an improved oxygen-fired reforming process that reduces the cost of CO2 capture.

SUMMARY

The present disclosure relates to a process that uses the syngas product from an oxygen-fired reformer to provide all heating duties needed in the reforming process, including exporting superheated steam, while eliminating the need for any fired heaters or boilers. Essentially complete CO2 capture is possible due to the elimination of flue gas stream. The size of the waste heat boiler is reduced to increase the amount of high quality heat the downstream syngas stream is able to deliver for process heating and steam generation.

Aspect 1: A process for producing syngas, the process comprising reacting a preheated feed stream comprising methane and an oxidant selected from the list of water and carbon dioxide with an oxygen-enriched stream to produce a first syngas stream comprising hydrogen, carbon monoxide, water, and soot; heating a boiler feed water stream by indirect heat exchange with the first syngas stream to produce a steam stream and a second syngas stream; and heating one or more of the steam stream and a mixed feed stream by indirect heat exchange with the second syngas stream to produce a third syngas stream; wherein the preheated feed stream comprises the mixed feed stream.

Aspect 2: A process according to Aspect 1, wherein the temperature of the second syngas stream is between 345° C. and 455° C.

Aspect 3: A process according to Aspect 1 or Aspect 2, further comprising reacting the water and carbon dioxide in the third syngas stream to produce a shifted syngas stream; and heating one or more of the steam stream and the mixed feed stream by indirect heat exchange with the shifted syngas stream to produce a second shifted syngas stream.

Aspect 4: A process according to any of Aspects 1 to 3, further comprising removing soot from the third syngas stream without contacting the third syngas stream with liquid water.

Aspect 5: An apparatus for producing syngas, the apparatus comprising a partial oxidation reactor configured to react a preheated feed stream with an oxygen-enriched stream to produce a first syngas stream comprising hydrogen, carbon monoxide, and carbon dioxide; a first heat exchanger system for heating a boiler feed water by indirect heat exchange with the first syngas stream to produce a steam stream and a second syngas stream; a second heat exchanger system for heating one or more of the steam stream and a mixed feed stream by indirect heat exchange with the second syngas stream to produce a third syngas stream; wherein when the second heat exchanger system heats the mixed feed stream the second heat exchanger system is in fluid flow communication with the partial oxidation reactor.

Aspect 6: An apparatus according to Aspect 5, further comprising a shift reactor configured to accept the third syngas stream or a stream derived from the third syngas stream to produce a shifted syngas stream, wherein the shift reactor comprises a shift catalyst for reacting water with carbon dioxide to produce hydrogen and carbon monoxide; and a third heat exchanger for heating one or more of the steam stream and the mixed feed stream by indirect heat exchange with the shifted syngas stream to produce a second shifted syngas stream.

Aspect 7: An apparatus according to Aspect 6 or Aspect 7, further comprising a soot removal system configured to remove soot from the third syngas stream without contacting the third syngas stream with liquid water.

BRIEF DESCRIPTION OF THE DRAWINGS

The present invention will hereinafter be described in conjunction with the appended figures wherein like numerals denote like elements.

DETAILED DESCRIPTION

Figure 1:
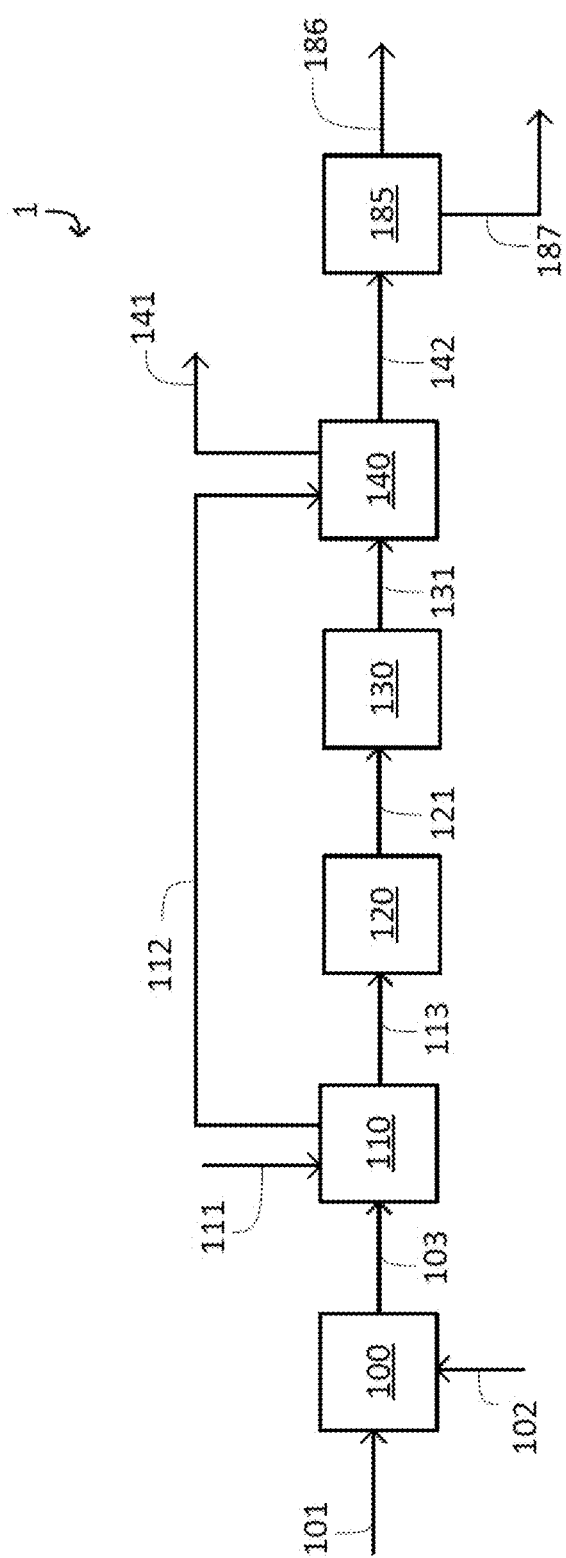
FIG. 1 is a flowsheet schematic depicting a prior art partial oxidation process for hydrogen production with carbon dioxide capture.

A prior art partial oxidation process 1 is illustrated in FIG. 1. A feed stream 101 and oxygen-enriched stream 102 are fed to the combustion chamber of a partial oxidation (POX) reactor 100, also known as a refractory-lined gasifier, where the partial oxidation reaction takes place at approximately 1315° C., or between 1200° C. and 1400° C. to produce a syngas stream 103 comprising predominantly H2, CO, H2O, CO2, CH4, and soot. The syngas stream 103 transfers heat indirectly to boiler feed water stream 111 in waste heat boiler (WHB) 110 to produce a high pressure saturated steam 112. The syngas stream 113 leaves the WHB at about 300° C. and enters a wet syngas scrubber 120 to remove any entrained soot using a liquid water wash. The scrubbed syngas stream 121 enters a high-temperature water gas shift (WGS) reactor 130 where CO reacts with H2O to produce H2 and CO2. Heat from the exothermic reaction increases the temperature of shifted syngas stream 131 to about 470° C., a much higher quality heat source than the 300° C. temperature of syngas stream 113. The shifted syngas stream 131 transfers heat indirectly to high pressure saturated steam 112 in steam superheater (SSH) 140 to produce superheated steam 141. The shifted syngas stream 131 could also be used to preheat the feed stream, boiler feed water, generate steam, or the feed to the high-temperature WGS reactor. Crucially, the amount of heat in shifted syngas stream 131 is limited and cannot fulfill all of these demands. Shifted syngas stream 142 leaves the steam superheater (SSH) 140 and enters carbon dioxide separation system 185 that produces a crude H2 stream 186 for further purification as a H2 product and a CO2 stream 187 that can be captured and/or utilized. The carbon dioxide separation system 185 can be an amine-based CO2 acid gas removal (AGR) unit. The heat duty for the reboiler may be provided by the heat from the shifted syngas stream 142 and supplemented with steam if needed. The carbon dioxide separation system 185 can also be other AGR units based on different solvents, or a vacuum swing adsorption (VSA) based CO2 recovery unit.

Partial oxidation process 1 has no fired heater, which allows CO2 capture from a concentrated syngas stream rather than a dilute flue gas stream. A fired heater would provide more high-quality heat to perform steam superheating and feed stream preheating. The former requires temperatures around 400° C. and is needed to export stream. The latter is desired to be to as high a temperature as possible (e.g., >425° C.) to reduce O2 consumption in the partial oxidation reactor 100. The partial oxidation process 1 does not have enough heat above 400° C. to perform both functions, so in FIG. 1 steam superheating replaces feed preheating. Alternatively, shifted syngas stream 131 could be used to preheat the feed stream, but there is not enough heat to do both.

The present invention seeks to improve on the prior art process by increasing the amount of heat that is available at a high-quality temperature. An embodiment of the present invention is illustrated as partial oxidation process 2 in FIG. 2. A preheated feed stream 201 is reacted with oxygen-enriched stream 202 in partial oxidation (POX) reactor 200 to produce a first syngas stream 203 comprising predominantly H2, CO, H2O, CO2, CH4, and soot. Process steam may also be injected into the gasifier burners in the partial oxidation (POX) reactor 200 as a moderator or to improve burner operation. The oxygen-enriched stream 202 may be preheated in oxygen preheater 205, for example using excess steam from the process as a heat source to heat ambient temperature oxygen-enriched stream 206. The first syngas stream 203 transfers heat indirectly to boiler feed water stream 211 in waste heat boiler (WHB) 210 to produce a high pressure saturated steam 212 and a second syngas stream 213. The second syngas stream 213 leaves the WHB at a temperature from 200° C. to 455° C., or from 345° C. to 455° C., or from 400° C. to 455° C. The upper limit of 455° C. is chosen to avoid the metal dusting regime.

Metal dusting is a result of reaction of CO in the syngas with the iron on the surface of heat recovery equipment. The reaction forms iron carbide that flakes off from the metal surface (dusting), eventually leading to equipment failure. Metal dusting occurs most rapidly when the metal temperature is in the metal dusting temperature range (~455 to ~700 C), limited by thermodynamics and kinetics. Heat recovery from syngas is therefore difficult in the metal dusting temperature range. Conventionally, a waste heat boiler (WHB) is used to recover the syngas heat from its reformer outlet temperature to around 455 C. The boiling will keep the metal temperature of the WHB low (e.g., <455 C) to prevent metal dusting, effectively quenching the syngas.

Figure 2:
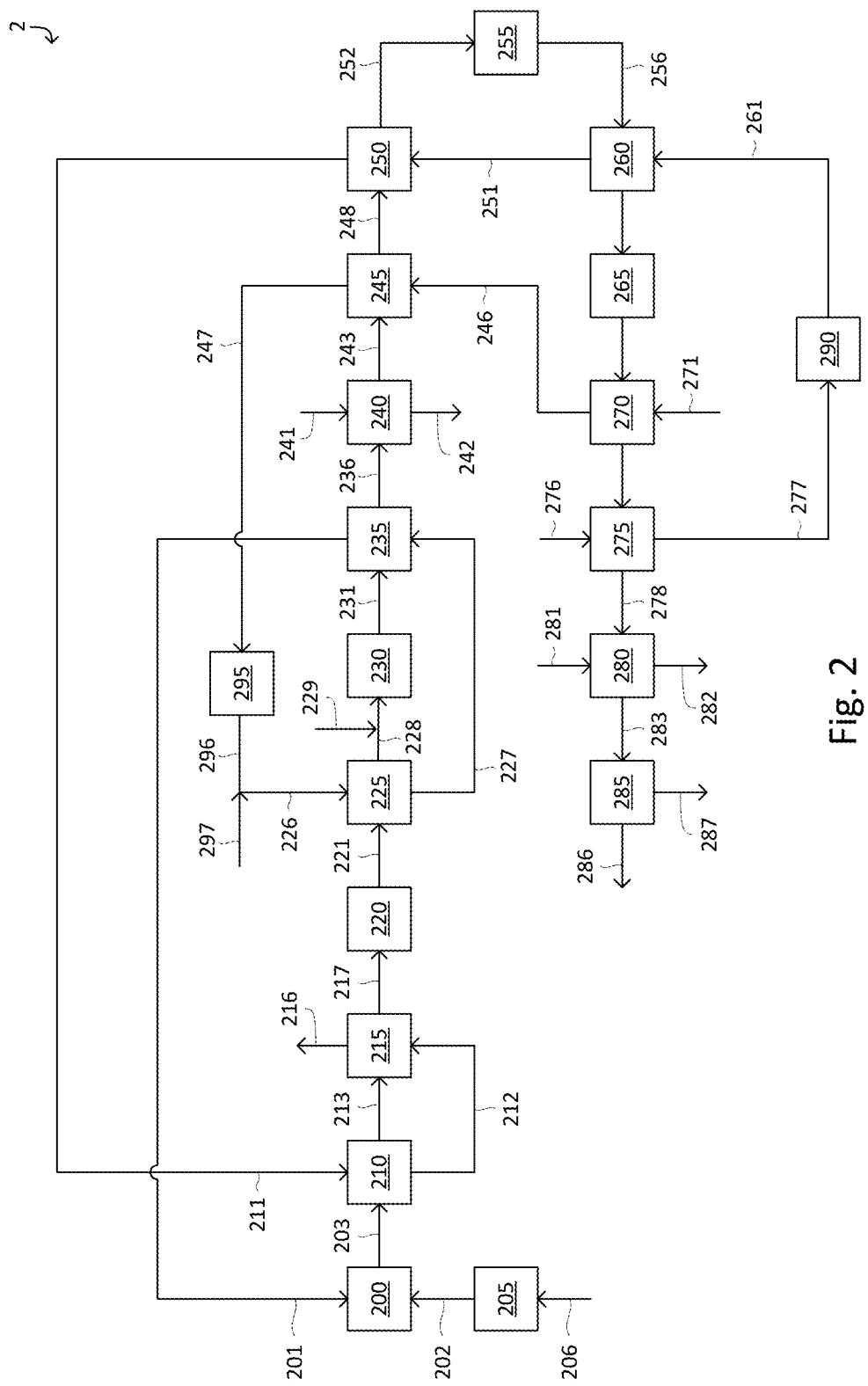
FIG. 2 is a flowsheet schematic depicting an embodiment of a partial oxidation process in which heat is recovered from a syngas stream after the waste heat boiler and before the high-temperature shift reactor to superheat a saturated steam stream, according to an example embodiment.

The temperature of the second syngas stream 213 is preferably kept closer to the metal dusting limit to maintain a high-quality heat source that can be used for feed preheating or steam superheating. The higher temperature in second syngas stream 213 compared to the equivalent syngas stream 113 in FIG. 1 is possible because the soot removal system 220 in FIG. 2 is a dry filter, or any other suitable soot removal system that does not contact the syngas stream with liquid water, rather than the wet syngas scrubber 120 in the prior art. A wet scrubber would contact the syngas stream with liquid water as is the case in FIG. 1, quenching the syngas stream and wasting the heat. Rather than wasting the high quality heat from the higher-temperature second syngas stream 213 in the downstream soot removal system 220, the high quality heat can be used to perform all process heating needs for the process 2 and export superheated steam 216 without requiring any fired preheaters or boilers. Using a soot removal system 220 that does not contact the syngas with a liquid water stream has higher capital costs than the wet scrubber 120, but does not consume high quality heat and therefore allows more efficient heat integration.

The second syngas stream 213 transfers heat indirectly to high pressure saturated steam 212 in steam superheater (SSH) 215 to produce a third syngas stream 217. Soot in the third syngas stream is removed by the soot removal system 220 to produce a cleaned third syngas stream 221. The superheated steam 216 can be exported or used in the process. The cleaned third syngas stream 221 next transfers heat indirectly to feed stream 226 in first stage mixed feed preheater 225. The syngas stream 228 may then optionally have process steam 229 added prior to entering a high-temperature water gas shift (WGS) reactor 230 where CO reacts with H2O to produce H2 and CO2. Process steam 229 may be saturated steam, superheated steam, or a combination of the two.

The high temperature water gas shift (WGS) reactor 230 comprises a shift catalyst comprising one or more of materials such as iron oxide, chromium oxide, copper oxide, and zinc oxide, to catalyze the WGS reaction. Heat from the exothermic WGS reaction increases the temperature of shifted syngas stream 231 as in the prior art, resulting in a high-quality heat source. The shifted syngas stream 231 can then transfer heat indirectly to the feed stream 227 in second stage mixed feed preheater 235, producing the preheated feed stream 201. The shifted syngas stream 236 can then transfer heat indirectly to boiler feed water stream 241 to generate additional high pressure steam 242 if needed in steam generator 240. The shifted syngas 243 may then transfer heat to feed stream 246 in a second stage feed preheater 245, producing feed stream 247 and shifted syngas stream 248.

The shifted syngas stream 248 may then transfer heat indirectly to boiler feed water stream 251 in a second stage boiler feed water preheater 250 to produce the boiler feed water stream 211. Shifted syngas stream 252 may then enter low-temperature WGS reactor 255 where CO reacts with H2O to produce H2 and CO2 to produce a second shifted syngas stream 256. The second shifted syngas stream 256 can then be used as a low-quality heat source for more heat integration and may transfer heat indirectly to boiler feed water stream 261 in first stage boiler feed water preheater 260, followed by providing heat to the carbon dioxide separation system heat exchanger 265, the feed stream 271 in first stage feed preheater 270, and boiler feed water stream 276 in water heater 275.

A person of skill in the art will recognize that the order of preheating the feed and boiler feed water may be changed in order to optimize the heat integration for a particular case. Multiple stages of heat transfer may be combined into a single stage as part of the tradeoff between thermodynamic efficiency and capital cost.

If needed, syngas stream 278 may be cooled in trim cooler 280 using cooling water stream 281 to reach the necessary temperature for downstream processing, producing a cooled syngas stream 283 and a spent cooling water stream 282. If water condenses in the cooled syngas stream 283 it may be removed using a gas-liquid separator. Carbon dioxide may then be removed from the cooled syngas stream 283 in a carbon dioxide separation system 285 that produces a crude H2 stream 286 for further purification as a H2 product and a CO2 stream 287 that can be captured and/or utilized. As in the case of FIG. 1, The carbon dioxide separation system 285 can be an amine-based CO2 acid gas removal (AGR) unit. In this case, the carbon dioxide separation system heat exchanger 265 will be the reboiler of the stripper column in the AGR unit. The heat duty for the reboiler may be supplemented with steam if needed. The carbon dioxide separation system 285 can also be other AGR units based on different solvents. It can also be a vacuum swing adsorption (VSA) based CO2 recovery unit, in which case the carbon dioxide separation system heat exchanger 265 requires no heat input.

Crude H2 stream 286 may be purified by any practical means including adsorption, cold box, or methanator. Typically for a H2 product this would be carried out using pressure swing adsorption unit (PSA) which would produce a pure H2 product and a tail gas stream comprising CO, H2 and unconverted methane that could be recycled to the feed stream. When one or more product streams are desired with any combination of composition ranging from pure H2 to pure CO and any mixture of the two, typically a cold box, or cryogenic separation unit, would be used. When it is acceptable by the end use, the syngas from the AGR unit may also go through a methanation reactor (methanator) where the CO in the syngas reacts with H2 to form CH4, resulting in a product stream containing H2 and a small amount of CH4 (e.g., <5 mol %), and free of CO. The methanator operates at elevated temperatures (e.g., >260 F). The feed syngas to the methanator can be heated by its effluent in a heat exchanger. The effluent from the heat exchanger will be cooled to condense out the water formed in the methanator. No recycle is needed when methanation is used at the back end of the process.

Additional purification steps may be required for the feed stream and/or the boiler feed water stream. Sulfur may be removed from the feed stream 247 in hydrodesulfurizer (HDS) unit 295. Typically the partial oxidation (POX) reactor 200 can operate with sulfur in the feed stream. Alternative options to remove sulfur would be to use an HDS unit on the syngas stream, combined with the carbon dioxide separation system 285 being an AGR unit, or using a sulfur adsorber to treat the feed stream 271. Feed stream 296 may then be combined with process steam 297 before entering the first stage mixed feed preheater 225 as feed stream 226. The addition of steam is optional, but preferred when the feed contains heavy hydrocarbons and/or is preheated in the second stage mixed feed preheater 235 to a temperature above about 425° C. At these high temperatures additional steam can prevent cracking reactions from occurring in the hydrocarbons which in turn can lead to solid carbon forming and fouling the heat exchanger. Boiler feed water stream 277 may enter a deaerator 290 to separate any dissolved gases.

Carbon dioxide can be injected into the process upstream of the partial oxidation (POX) reactor 200 if more CO is desired in the final product. Carbon dioxide can partially or completely replace steam in the reforming reaction. The carbon dioxide functions as an oxidant to react with methane just as steam reacts with methane in steam reforming. Effectively, dry reforming can be thought of as stoichiometrically equivalent to the combination of a steam reforming reaction and a reverse WGS reaction as shown below. In this case, a carbon-dioxide rich stream may be combined with feed stream 226, feed stream 227, or the preheated feed stream 201.

$$CO2+CH4=2H2+2CO \qquad \text{(dry reforming)}$$

$$H2O+CH4=3H2+CO \qquad \text{(steam reforming)}$$

$$CO2+H2=CO+H2O \qquad \text{(reverse WGS)}$$

Figure 3:
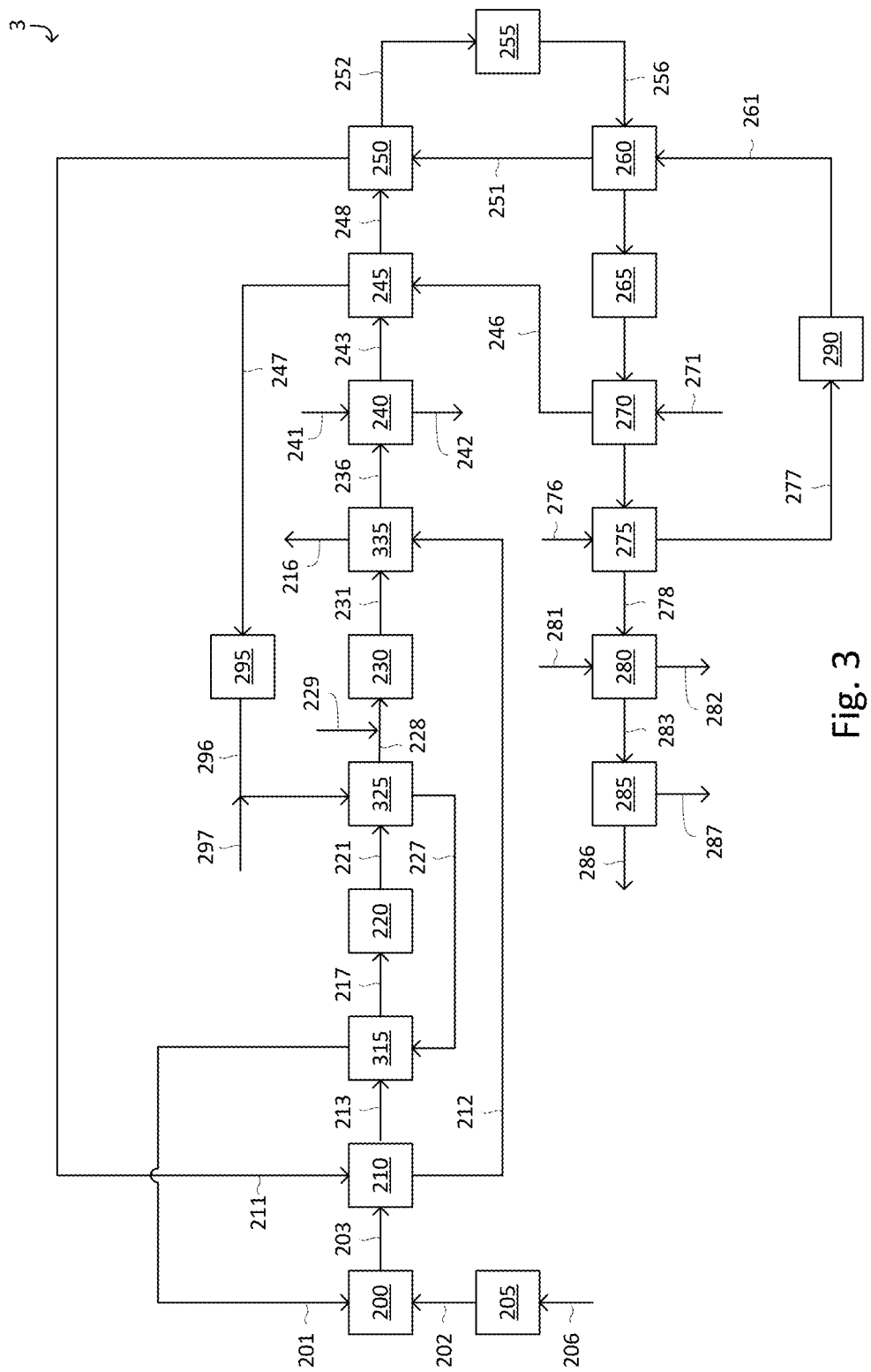
FIG. 3 is a flowsheet schematic depicting a modification of FIG. 2 in which heat is recovered from a syngas stream after the waste heat boiler and before the high-temperature shift reactor to preheat a mixed feed, according to an additional example embodiment.

Another embodiment of the present invention is illustrated as POX process 3 in FIG. 3. Here the syngas stream 213 leaving the waste heat boiler 210 is used to heat the mixed feed stream 227 by indirect heat exchange in second stage mixed feed preheater 315. After soot removal in soot removal system 220 the syngas stream is used to heat the mixed feed stream 296 by indirect heat exchange in first stage mixed feed preheater 325. The shifted syngas stream 231 leaving the high-temperature WGS reactor 230 is used to superheat the saturated steam 212 by indirect heat exchange in steam superheater 335.

Figure 4:
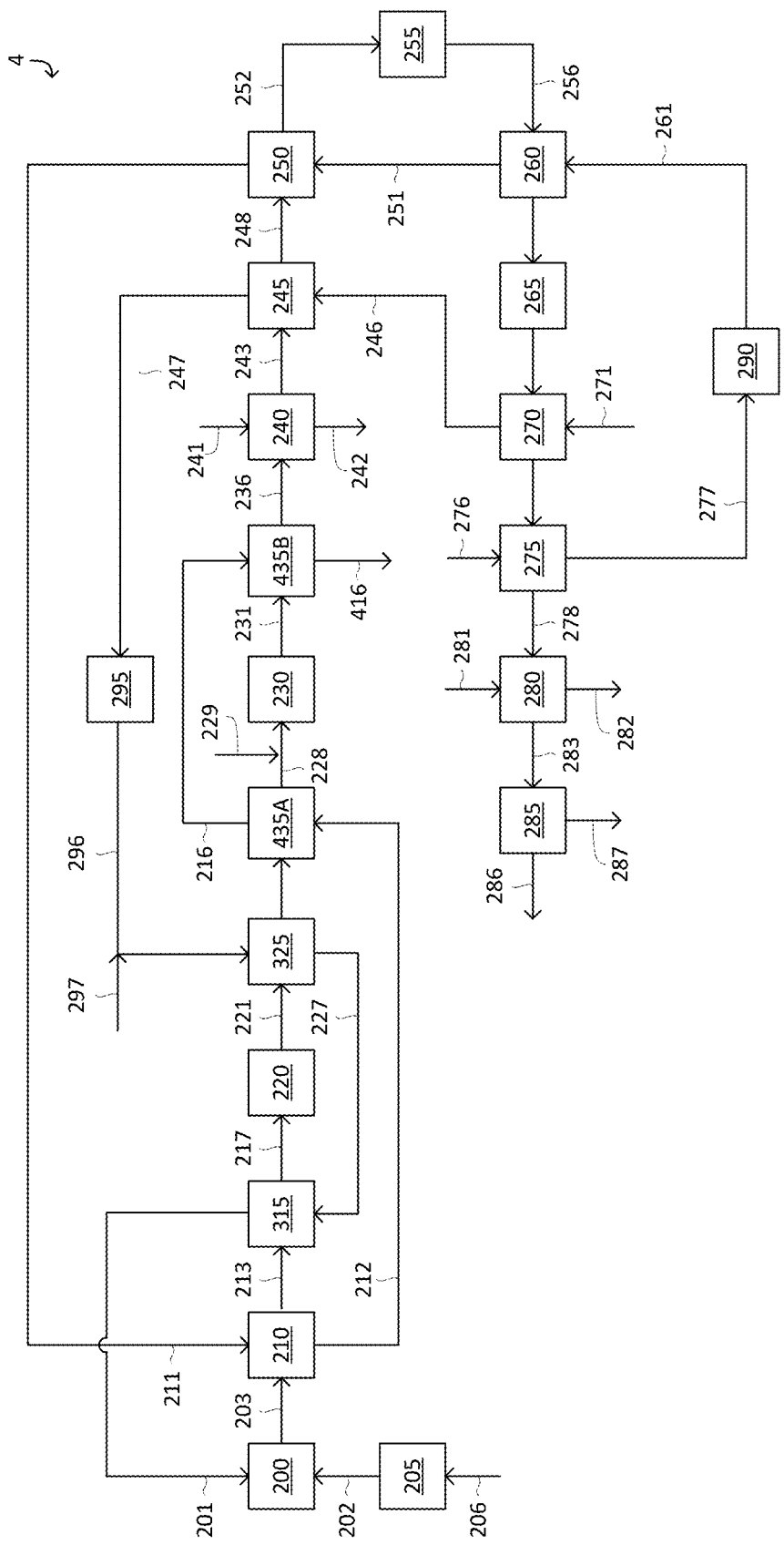
FIG. 4 is a flowsheet schematic depicting a modification of FIG. 3 in which saturated steam is superheated in two stages, one before and one after the water gas shift reactor, according to another example embodiment.

POX process 3 can be further modified, illustrated as POX process 4 in FIG. 4. Superheating of saturated steam 212 is performed in two stages, a first stage steam superheater 435A upstream of the high-temperature WGS reactor and a second stage steam superheater 435B downstream, resulting in superheated steam 416. A person of skill in the art will appreciate that any combination of heating duty may be provided by the syngas after the waste heat boiler 210 and after the exothermic high-temperature WGS reactor 230 which can be used for feed preheating, steam superheating, carbon dioxide capture, or other process heating needs.

EXAMPLES

The embodiments of both the prior art partial oxidation process 1 of FIG. 1 and the inventive partial oxidation process 2 of FIG. 2 were analyzed using the commercially available Aspen process modeling software. Results are summarized in Table 1. Both processes are normalized to produce the same amount of H2 and superheat steam to the same temperature of 399° C. Net specific energy consumption is defined as the high heating value of the natural gas in the feed to the process minus the heating value of the steam exported from the process, divided by the flow rate of the H2 product, normalized so that the prior art process is equal to 100. Oxygen consumption form the process is also normalized to 100 for the prior art process. As can be seen in Table 1, the present invention lowers the net specific energy consumption and oxygen consumption relative to the prior art, in part due to the higher temperature of the feed to the POX reactor, feed stream 101 in FIG. 1 and preheated feed stream 201 in FIG. 2.

TABLE 1

|  | Prior Art FIG. 1 | Invention FIG. 2 |
| --- | --- | --- |
| Net specific energy consumption | 100 | 99.7 |
| POX feed temp (C.) | 278 | 433 |
| O2 consumption | 100 | 93.2 |

While the principles of the invention have been described above in connection with preferred embodiments, it is to be clearly understood that this description is made only by way of example and not as a limitation of the scope of the invention.

We claim:

1. A process for producing syngas, the process comprising:

reacting a preheated feed stream comprising methane and an oxidant selected from the group consisting of water and carbon dioxide with an oxygen-enriched stream to produce a first syngas stream comprising hydrogen, carbon monoxide, carbon dioxide, water, and soot;

heating a boiler feed water stream by indirect heat exchange with the first syngas stream to produce a steam stream and a second syngas stream; and heating one of the steam stream and a mixed feed stream by indirect heat exchange with the second syngas stream to produce a third syngas stream, wherein the mixed feed stream comprises methane and an oxidant selected from the group consisting of water and carbon dioxide;

removing soot from the third syngas stream without contacting the third syngas stream with liquid water to produce a cleaned third syngas stream; and heating the other of the steam stream and the mixed feed stream by indirect heat exchange with the cleaned third syngas stream or a stream derived from the cleaned third syngas stream;

wherein the preheated feed stream comprises the mixed feed stream.

2. The process of claim 1, wherein the temperature of the second syngas stream is between 345° C. and 455° C.

3. The process of claim 1, further comprising reacting the water and carbon monoxide in the third syngas stream to produce a shifted syngas stream; and heating one or more of the steam stream and the mixed feed stream by indirect heat exchange with the shifted syngas stream to produce a second shifted syngas stream.

* * * * *